US008463304B2

(12) United States Patent
Lauer et al.

(10) Patent No.: US 8,463,304 B2
(45) Date of Patent: Jun. 11, 2013

(54) SHORT CODE PROVISIONING AND THREADING TECHNIQUES FOR BIDIRECTIONAL TEXT MESSAGING

(75) Inventors: John Lauer, Seattle, WA (US); Anthony Riemma, Seattle, WA (US); John Larson, Issaquah, WA (US); Michael Smyers, Seattle, WA (US)

(73) Assignee: Zipwhip, Inc., Seattle, WA (US)

( * ) Notice: Subject to any disclaimer, the term of this patent is extended or adjusted under 35 U.S.C. 154(b) by 425 days.

(21) Appl. No.: 12/705,453

(22) Filed: Feb. 12, 2010

(65) Prior Publication Data

US 2010/0210291 A1 Aug. 19, 2010

Related U.S. Application Data

(60) Provisional application No. 61/153,219, filed on Feb. 17, 2009.

(51) Int. Cl.
*H04W 4/00* (2009.01)
*G06F 15/16* (2006.01)

(52) U.S. Cl.
USPC .......................................... 455/466; 709/206

(58) Field of Classification Search
USPC ............... 455/466, 412.2; 709/203, 204, 206, 709/207
See application file for complete search history.

(56) References Cited

U.S. PATENT DOCUMENTS

| | | | | |
|---|---|---|---|---|
| 7,039,677 B2 * | 5/2006 | Fitzpatrick et al. | ........... | 709/204 |
| 7,072,941 B2 * | 7/2006 | Griffin et al. | ............... | 709/204 |
| 7,539,295 B1 * | 5/2009 | Amir et al. | ............ | 379/265.01 |
| 7,620,407 B1 * | 11/2009 | Donald et al. | .................. | 455/466 |
| 7,725,538 B2 * | 5/2010 | Kirkland et al. | ............... | 709/204 |
| 7,978,828 B1 * | 7/2011 | Edamadaka et al. | ........ | 379/88.13 |
| 2002/0055350 A1 * | 5/2002 | Gupte et al. | ................... | 455/412 |
| 2002/0095462 A1 * | 7/2002 | Beck et al. | ..................... | 709/204 |
| 2002/0137530 A1 * | 9/2002 | Karve | ............................ | 455/466 |
| 2003/0114174 A1 * | 6/2003 | Walsh et al. | .................. | 455/466 |
| 2003/0199730 A1 * | 10/2003 | Kakuta et al. | ................. | 345/758 |
| 2004/0003030 A1 * | 1/2004 | Abe | ................................ | 709/203 |
| 2004/0015547 A1 * | 1/2004 | Griffin et al. | ................. | 709/204 |
| 2004/0169675 A1 * | 9/2004 | Beck et al. | ..................... | 345/705 |
| 2005/0055414 A1 * | 3/2005 | Laakkonen | ................... | 709/207 |
| 2005/0278366 A1 * | 12/2005 | Horvitz et al. | ................. | 707/100 |
| 2006/0031304 A1 * | 2/2006 | Bagga et al. | .................. | 709/206 |
| 2006/0034433 A1 * | 2/2006 | Landsperger | .............. | 379/93.06 |
| 2006/0271630 A1 * | 11/2006 | Bensky et al. | ................ | 709/206 |
| 2008/0052365 A1 | 2/2008 | Mousseau et al. | | |
| 2008/0114972 A1 * | 5/2008 | Codrescu et al. | ............. | 712/227 |
| 2008/0168146 A1 * | 7/2008 | Fletcher | ........................ | 709/206 |
| 2008/0172469 A1 * | 7/2008 | Verona | ........................... | 709/206 |
| 2008/0215607 A1 * | 9/2008 | Kaushansky et al. | ......... | 707/102 |
| 2009/0063636 A1 * | 3/2009 | Heidloff et al. | ................ | 709/206 |
| 2009/0210778 A1 * | 8/2009 | Kulas et al. | .................... | 715/201 |
| 2010/0175003 A1 * | 7/2010 | Castellucci | ................... | 715/758 |
| 2011/0023053 A1 * | 1/2011 | Gathman et al. | .............. | 719/320 |

OTHER PUBLICATIONS

PCT/US10/24138, International Search Report (Apr. 2, 2010). Applicant: Zip-Whip, Inc.

\* cited by examiner

*Primary Examiner* — Dwayne Bost
*Assistant Examiner* — Scott Trandai
(74) *Attorney, Agent, or Firm* — Cooley LLP

(57) ABSTRACT

A computer readable storage medium includes executable instructions, which when executed by a computer, cause the computer to designate a selected thread identification value from a collection of thread identification values based upon recognition criteria. The selected thread identification value is utilized during bidirectional text messaging between a first user and a second user.

11 Claims, 3 Drawing Sheets

SHORT CODE PROVISIONING AND THREADING TECHNIQUES FOR BIDIRECTIONAL TEXT MESSAGING

CROSS-REFERENCE TO RELATED APPLICATION

This application claims priority to U.S. Provisional Patent Application Ser. No. 61/153,219, filed Feb. 17, 2009, entitled "Short Code Provisioning and Threading Techniques for Bidirectional Text Messaging", the contents of which are incorporated herein by reference.

FIELD OF THE INVENTION

The present invention is directed toward text messaging. More particularly, the present invention is directed toward bidirectional text messaging using permanently provisioned threads.

BACKGROUND OF THE INVENTION

"Text messaging" or "texting" refers to the exchange of brief written messages between mobile phones over cellular networks. In some embodiments, text messages are restricted to 160 characters or fewer, although in other embodiments, text messages may be longer, or even unrestricted in length, and may include media objects. Text messages may be sent via various communications protocols, including Short Message Service ("SMS"), Enhanced Messaging Service ("EMS"), Multimedia Messaging Service ("MMS"), and other protocols.

"Bidirectional text messaging" refers to the ability for two devices to communicate back and forth, i.e., a message is sent from device A to device B, and a reply is sent from device B to device A. Another example is a message is sent from a software application by user A to device B and the reply is sent from device B to user A with message routing performed by the software application.

"Short codes" are numbers, similar to telephone numbers, which can be used to address text messages. Short codes commonly range in length from four to twelve digits, although in other embodiments, short codes may be longer or shorter. Short codes can be obtained via the CSCA (Common Short Code Authority) or via proprietary short code extensions obtained directly through negotiations with wireless carriers. If obtained through the CSCA, the short code will be provisioned with all carriers associated with the SMS Aggregator with which the code is filed. If obtained directly through wireless carriers, the short code will only be provisioned to carry text messages to that specific carrier network. Short codes are referred to as "threads," "Thread IDs" or "Forward Thread IDs" in this document depending on their context. "Threads" refer to short codes, including 10 digit telephone numbers, used to address text messages.

"Thread suffix" refers to the last four digits of a thread.

"Thread suffix vector" refers to the first two digits of the thread suffix and indicates who or what (in the case of a device) is in control of the message. A vector of 00 means the sender is in control. A vector of 01 means the recipient is in control.

"Channel ID" refers to the last two digits of a thread suffix. The Channel ID is made consistent across all threads and forward threads used for text messaging.

"Threading System" refers to the software based rules and logic applied to the allocation of Thread IDs and Forward Thread IDs.

"SMS gateway" is the term used to describe a service transforming messages to mobile network traffic from other media, or vice versa, allowing transmission or receipt of SMS messages without the use of a mobile phone. Typical use of a gateway would be to forward simple e-mail to a mobile phone recipient. Thus, the SMS gateway facilitates texting between mobile devices and non-mobile devices, thereby extending the typical definition of texting.

"Device" refers to any mobile device or non-mobile device that can send or receive text messages. The device may rely upon a wireless data connection, internet access, or the appropriate software to send and receive text messages.

"MDN" refers to the mobile device number associated with any device.

"Software Application" refers to a software application on a client machine, web interface, or numerous other hosts that use the threading system. Software can also be defined as anywhere a user or device originates a text message or it can be defined as any application that contains the Threading System.

"Subscriber" refers to a user of a Software Application as defined herein.

"Smart Forwarding" refers to a message forwarding delay technique in which the subscriber designates the device and the time that a message will be automatically forwarded according to a systematic event, such as an unread message.

There have been various implementations of software to mobile-only-device text messaging using Thread IDs. Companies such as AOL®, Google®, Microsoft®, and Yahoo® have implemented text messaging features in their respective Instant Messaging clients (and other similar applications, e.g., Google Voice®), however no one to date has allowed for permanent thread provisioning for the purpose of computer to device, device to computer, and device to device communications. Rather the technique to date has been to deliver messages to a mobile phone using a temporarily provisioned Thread ID that expires shortly after being used. This does not allow the message recipient to reply at any time because with no thread provisioned, there is no longer a reply path.

Applications have used SMS Gateways to send messages from a computer to a device or device to device, however these techniques employ the use of wireless carrier email extensions associated with the mobile number, which is unreliable and does not allow for user memorization or intuitive use.

Therefore, it would be desirable to provide a texting technique that does not rely upon wireless carrier email extensions.

With current SMS Gateway or email-to-SMS messaging systems, the subscriber of Carrier A must input the full email address of the message recipients wireless carrier, which is often unknown by the subscriber. It would be desirable to circumvent this problem.

It would be desirable to support the permanent provisioning of a unique and easy to memorize Thread ID for text messaging. Further, it would be desirable to employ pre-provisioned Thread IDs and Forwarding Thread IDs to create a dedicated communication channel.

SUMMARY OF THE INVENTION

A computer readable storage medium includes executable instructions, which when executed by a computer, cause the computer to designate a selected thread identification value from a collection of thread identification values based upon recognition criteria. The selected thread identification value is utilized during bidirectional text messaging between a first user and a second user.

BRIEF DESCRIPTION OF THE FIGURES

Like reference numerals refer to corresponding parts throughout the several views of the drawings.

DETAILED DESCRIPTION OF THE INVENTION

Figure 1:
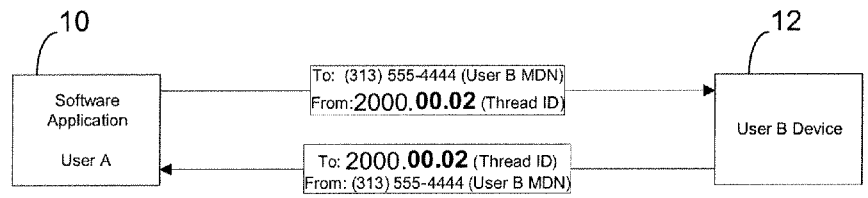
FIG. 1 shows the permanent provisioning of a Thread ID in accordance with an embodiment of the invention.

The invention includes a permanent Thread ID to enable bidirectional text messaging from a software application to a device. As shown in FIG. 1, this threading technique permanently provisions a Thread ID to enable bidirectional text messaging between a User A Software Application 10 (e.g., running on a PC) and User B Device 12 (e.g., a mobile device). In this example, the Software Application 10 accesses User B 12 via user B's MDN ((313)555-4444). User A is identified by Thread ID 2000.00.02. As shown in FIG. 1, this Thread ID is subsequently used to access User A through Software Application 10. Thus, the assignment of a permanent Thread ID provides for a permanent reply path for User B to respond to User A's text message. Preferably, the system permanently links the User B MDN and assigned Thread ID for all future communications between User A and User B.

A Thread ID is assigned to this conversation by the Threading System, which may be resident in software application 10. The Threading System may query an associated database for a Thread ID that has not been previously provisioned for a conversation with User B. Preferably, the Threading System looks at all available (previously unused) Thread IDs for the sender's MDN defined by the sender's wireless carrier and all available Thread IDs for the recipient's MDN defined by the recipient's wireless carrier. For example:

| Message Sender | | | | Message Recipient | | | Thread | |
|---|---|---|---|---|---|---|---|---|
| Carrier | MDN | Thread IDs | Used (y/n) | Carrier | MDN | Thread IDs | Used (y/n) | Match (y/n) |
| Carrier A | (313) 555-5555 | 200.000.02 | Y | Carrier B | (206) 444-4444 | 200.000.02 | N | |
| Carrier A | (313) 555-5555 | 200.000.03 | Y | Carrier B | (206) 444-4444 | 200.000.03 | N | |
| Carrier A | (313) 555-5555 | 200.000.04 | Y | Carrier B | (206) 444-4444 | 200.000.04 | Y | |
| Carrier A | (313) 555-5555 | 200.000.05 | N | Carrier B | (206) 444-4444 | 200.000.05 | N | Y |
| Carrier A | (313) 555-5555 | 200.000.06 | N | Carrier B | (206) 444-4444 | 200.000.06 | Y | |
| Carrier A | (313) 555-5555 | 200.000.07 | Y | Carrier B | (206) 444-4444 | 200.000.07 | Y | |
| Carrier A | (313) 555-5555 | 200.000.08 | Y | Carrier B | (206) 444-4444 | 200.000.08 | Y | |
| Carrier A | (313) 555-5555 | 200.000.09 | Y | Carrier B | (206) 444-4444 | 200.000.09 | Y | |
| Carrier A | (313) 555-5555 | 200.000.10 | Y | Carrier B | (206) 444-4444 | 200.000.10 | Y | |

Preferably, Thread IDs are sorted based upon ease of recognition. Various recognition criteria may be used. For example, the recognition criteria may favorably rank codes with a small number of different values. The recognition criteria may also favorably rank highly repetitive sequences of the same numeral. Alternately, the criteria may favorably rank a sequence of low numbers to high numbers.

Figure 2:
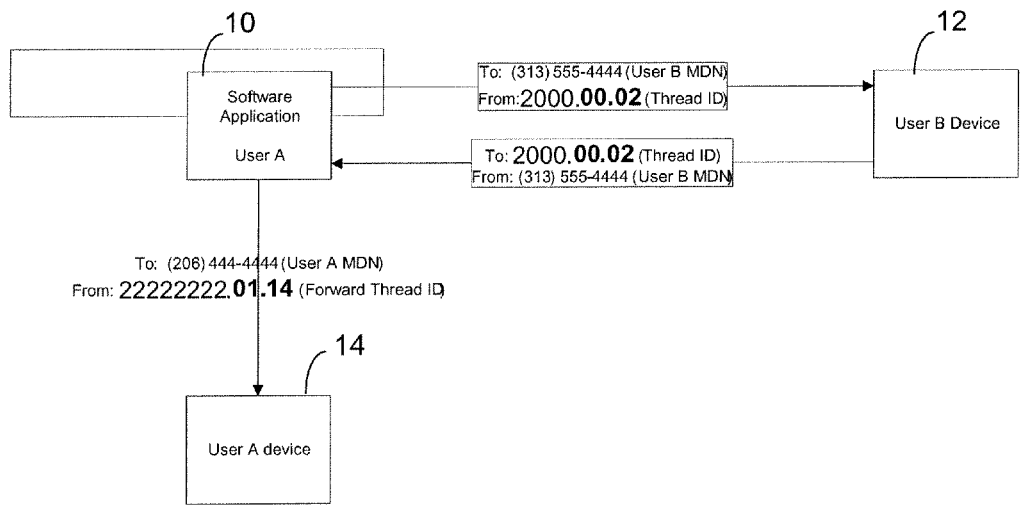
FIG. 2 shows the permanent provisioning of a Forward Thread ID in accordance with an embodiment of the invention.

FIG. 2 illustrates the use of a forwarding thread in accordance with an embodiment of the invention. A Forward Thread ID, in this case 22222222.01.14, allows User A 14 to receive a message on a mobile device 14.

Figure 3:
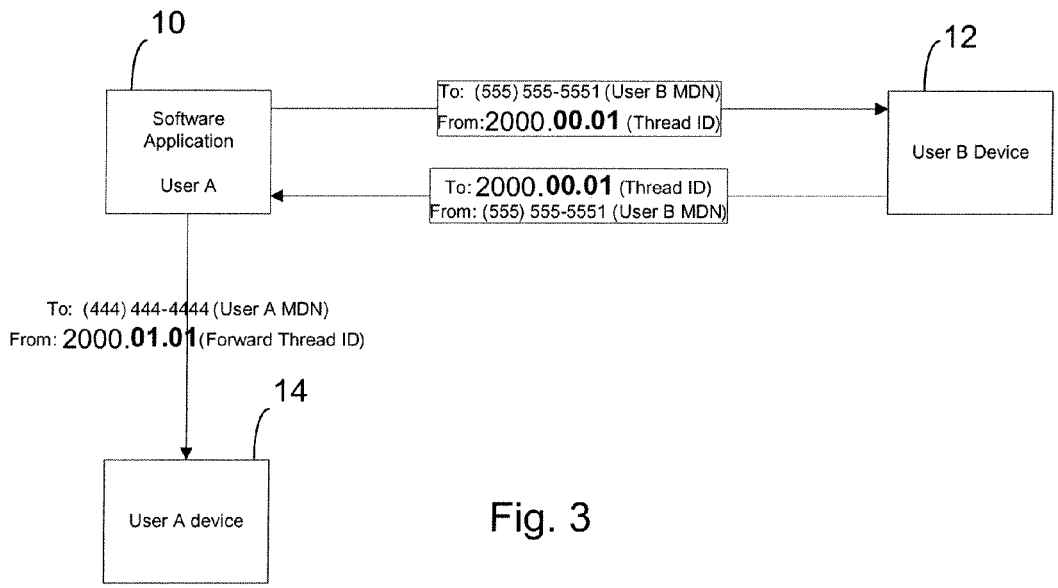
FIG. 3 shows the pre-allocation and provisioning of matching Thread IDs and Forwarding Thread IDs in accordance with an embodiment of the invention.

To encourage memorization and device address book entry by User A, the threading system assigns a matching Thread ID and Forward Thread ID as depicted in FIG. 3. That is, the Forward Thread ID of FIG. 2 is substituted with the Thread ID of FIG. 2, as shown in FIG. 3. A matching Forward Thread ID and Thread ID may not always be achievable since the desired Thread ID could have been allocated to another conversation.

This technique looks at all available (previously unused) Thread IDs and Forward Thread IDs for the sender's MDN defined by the sender's wireless carrier and all available Thread IDs and Forward Thread IDs for the recipient's MDN defined by the recipient's wireless carrier. For example:

| Message Sender | | | | | Message Recipient | | | | | Thread |
|---|---|---|---|---|---|---|---|---|---|---|
| Carrier | MDN | Thread IDs | Forward Thread IDs | Used (y/n) | Carrier | MDN | Thread IDs | Forward Thread IDs | Used (y/n) | Match (y/n) |
| Carrier A | (313) 555- | 200.000.02 | 200.001.02 | Y | Carrier B | (206) 444-4444 | 200.000.02 | 200.001.02 | N | |
| Carrier A | (313) 555- | 200.000.03 | 200.001.03 | Y | Carrier B | (206) 444-4444 | 200.000.03 | 200.001.03 | N | |
| Carrier A | (313) 555- | 200.000.04 | 200.001.04 | Y | Carrier B | (206) 444-4444 | 200.000.04 | 200.001.04 | Y | |
| Carrier A | (313) 555- | 200.000.05 | 200.001.05 | N | Carrier B | (206) 444-4444 | 200.000.05 | 200.001.05 | N | Y |
| Carrier A | (313) 555- | 200.000.06 | 200.001.06 | N | Carrier B | (206) 444-4444 | 200.000.06 | 200.001.06 | Y | |
| Carrier A | (313) 555- | 200.000.07 | 200.001.07 | Y | Carrier B | (206) 444-4444 | 200.000.07 | 200.001.07 | Y | |
| Carrier A | (313) 555- | 200.000.08 | 200.001.08 | Y | Carrier B | (206) 444-4444 | 200.000.08 | 200.001.08 | Y | |
| Carrier A | (313) 555- | 200.000.09 | 200.001.09 | Y | Carrier B | (206) 444-4444 | 200.000.09 | 200.001.09 | Y | |
| Carrier A | (313) 555- | 200.000.10 | 200.001.10 | Y | Carrier B | (206) 444-4444 | 200.000.10 | 200.001.10 | Y | |

To ensure that matching Thread IDs and Forward Thread IDs are available from a scarce list of IDs, a pre-allocation process for IDs may be utilized. The Thread IDs and Forward Thread IDs may be provisioned and set aside, even if they will never be used. The Thread IDs and Forward Thread IDs are assigned when an initial instant a message is composed or sent. Additionally, in the case of device-to-device communication, the pre-allocated Thread IDs could be stored on the device.

Figure 4:
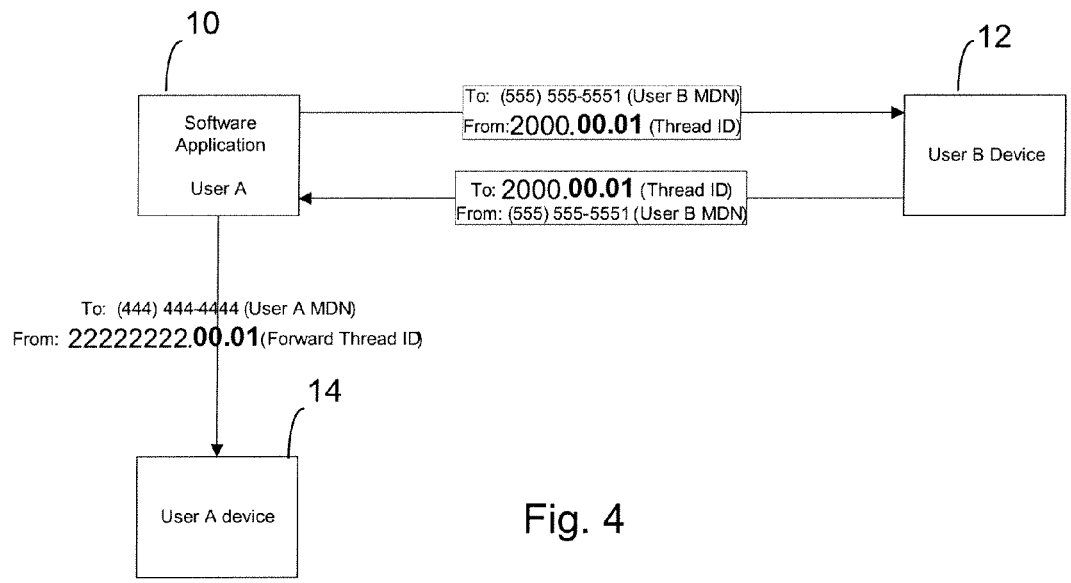
FIG. 4 shows the pre-allocation and provisioning of Thread IDs and Forward Thread IDs using the Thread Suffix of the invention.

An embodiment of the invention is directed toward the pre-allocation and provisioning of Thread IDs and Forward Thread IDs using a Thread Suffice. Matching thread and Forward Thread IDs may not always be available in the threading system, therefore, the invention utilizes the thread suffix, which is the last 4-digits of all short codes. Since a perfect mapping of the Thread ID and Forward Thread ID is not always available, the threading system attempts to match the thread suffix as show in FIG. 4. In particular, FIG. 4 shows a common thread suffix 00.01. This creates an easy to memorize Channel ID for bidirectional communication between User A and User B.

Figure 5:
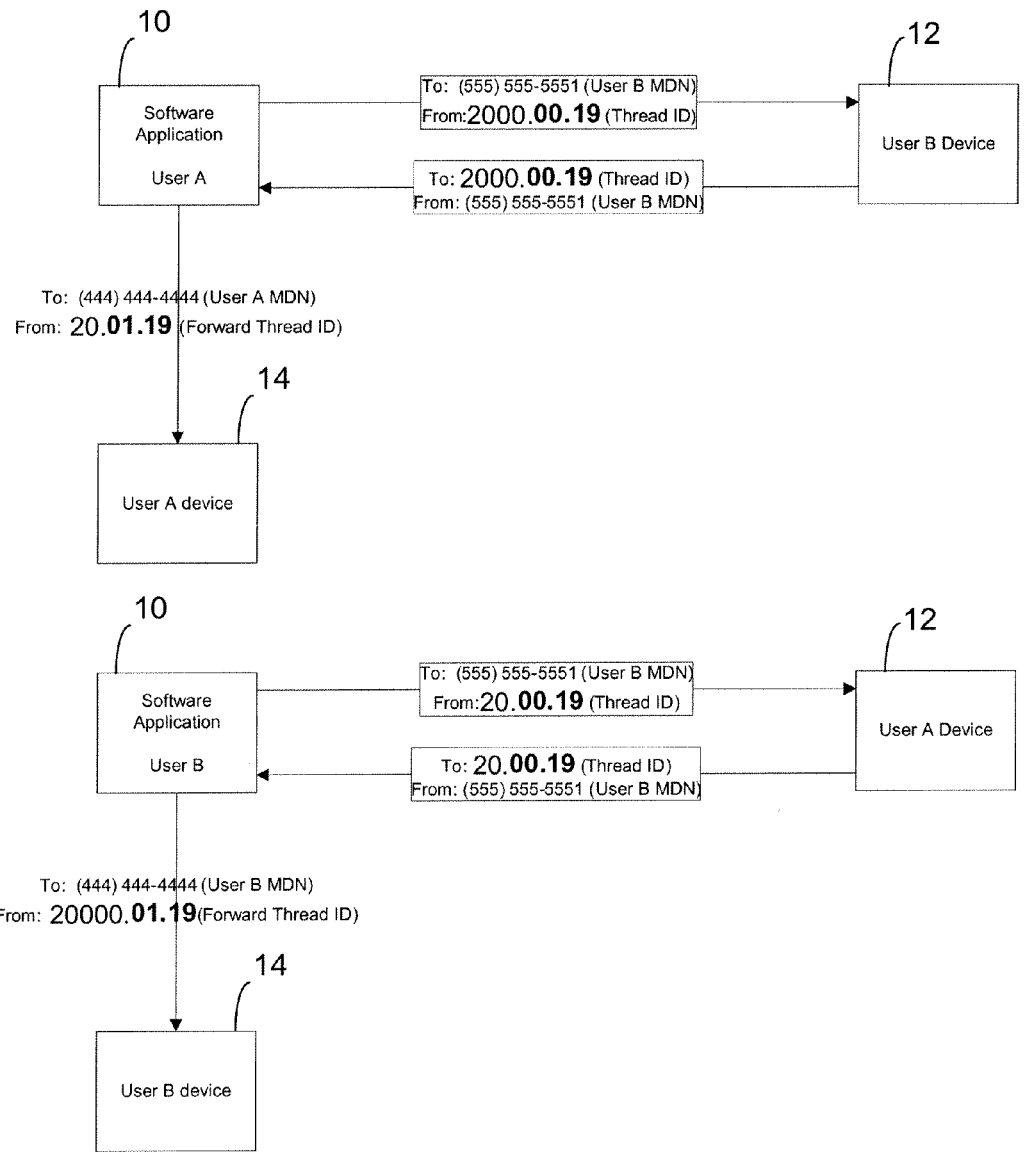
FIG. 5 shows the pre-allocation and provisioning of 2 Thread IDs and 2 Forwarding IDs for each one-to-one conversation, in accordance with an embodiment of the invention.

FIG. 5 illustrates an embodiment of the invention with a pre-allocation of two Thread IDs and two Forward IDs for each one-to-one conversation. To enable bi-directional communication in a 2-way conversation using Thread IDs and Forward Thread IDs, the invention utilizes four short codes to uniquely identify each leg of the conversation. As show in FIG. 5, the threading system pre-allocates four threads for each one-to-one conversation.

When allocating four short codes for a bi-directional conversation, a vector method is used, wherein a portion of the Thread Suffix is defined as the indicator of conversation direction. Conversation direction indicates which party controls a conversation. In one embodiment, a vector of 00 means the sender is in control and a vector of 01 means the recipient is in control.

To uniquely identify the one-to-one conversation inside the Thread Suffix, the invention uses a Channel ID to create a consistent identifier across all four threads. The Channel ID represents the single ID that is unique to the conversation between two individuals. In the example of FIG. 5, the channel ID is 19.

An embodiment of the invention is directed toward intelligent forwarding. When a subscriber receives a reply message from a message recipient, that message is received by the Software Application. The Software Application applies logic to decide what to do with the newly received message. Smart Forwarding inures that 'unread' subscriber messages are forwarded to the subscriber's designated device within a subscriber designated timeframe.

Consider the following example:
1. User A sends a message to User B via a Software Application.
2. User B replies from a mobile device.
3. User B's message is received by the Software Application and is displayed on the Software Application user interface for User A, the message recipient.
4. The network timer begins counting down according to the Smart Forwarding subscriber designated time, e.g. 30 seconds.
5. If User A reads the message, then the network timer stops counting down.
6. If User A does not read the message, then when the network timer counts down to zero, the Smart Forwarding mechanism forwards the message to the device designated by User A, e.g., a mobile device.

This technique ensures that the subscriber receives messages on their device of choice within a desired timeframe. If the user steps away from the Software Application (e.g., running on a PC) they can be assured they will still receive their messages (e.g., on their mobile device). Once the subscriber has received the forwarded message on a designated device, the subscriber can reply to it from that device. The Software Application will act as middleware, delivering the message to the desired recipient using the Threading System.

If the subscriber sets a Smart Forwarding timer to 'instantly', then all messages with a state of 'unread' are immediately forwarded to the subscriber's designated device.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed. An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions, which when executed by a computer, cause the computer to:
   designate a selected thread identification value from a collection of thread identification values based upon recognition criteria; and
   utilize the selected thread identification value during bidirectional text messaging between a first user and a second user, wherein the selected thread identification value is reserved for all future communications between the first user and the second user and the thread identification value is associated with a mobile device number; and wherein the selected thread identification value forms a permanent reply path between said first and second user in contrast to a temporarily provisioned thread identification value that expires shortly after being used.

2. The non-transitory computer readable storage medium of claim 1, wherein the selected thread identification value includes a thread suffix specifying a vector and channel identification.

3. The non-transitory computer readable storage medium of claim 2, wherein the vector specifies sender or recipient control.

4. The non-transitory computer readable storage medium of claim 2, wherein the channel identification specifies a unique communication session between the first user and the second user.

5. The non-transitory computer readable storage medium of claim 1, wherein the recognition criteria favorably ranks codes with a small number of different values.

6. The non-transitory computer readable storage medium of claim 1, wherein the recognition criteria favorably ranks codes with highly repetitive sequences of the same numeral.

7. The non-transitory computer readable storage medium of claim 1, wherein the recognition criteria favorably ranks codes with a sequence of low numbers to high numbers.

8. The non-transitory computer readable storage medium of claim 1, further comprising executable instructions to initially receive a text message at a first device associated with the first user and subsequently forward the text message to a second device associated with the first user in accordance with specified forwarding criteria.

9. The non-transitory computer readable storage medium of claim 8 wherein the specified forwarding criteria is a time delay prior to opening the text message.

10. The non-transitory computer readable storage medium of claim 1 further comprising executable instructions to match a selected thread identification value with a forward thread identification value.

11. The non-transitory computer readable storage medium of claim 1 further comprising executable instructions to reserve a set of matched thread identification values and forward thread identification values.

* * * * *